Dec. 16, 1947.                L. J. HAVILAND                2,432,887
         SEWAGE DISPOSAL APPARATUS COMPRISING A SEPTIC
         TANK AND AN EVAPORATING TANK HAVING A VENT
                    Filed Sept. 14, 1944
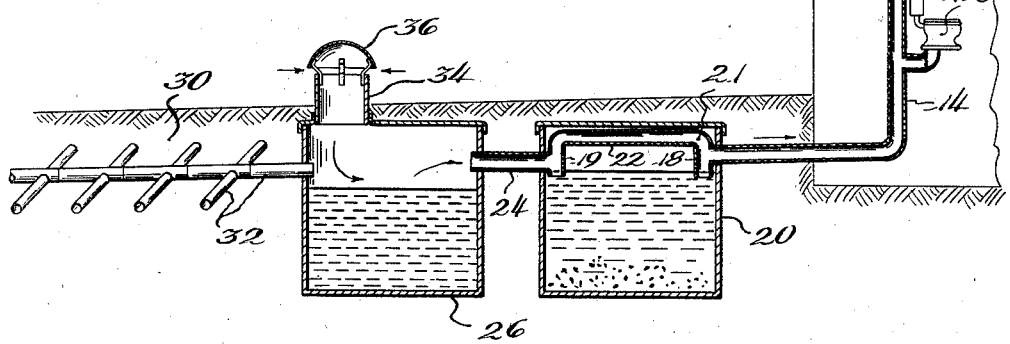
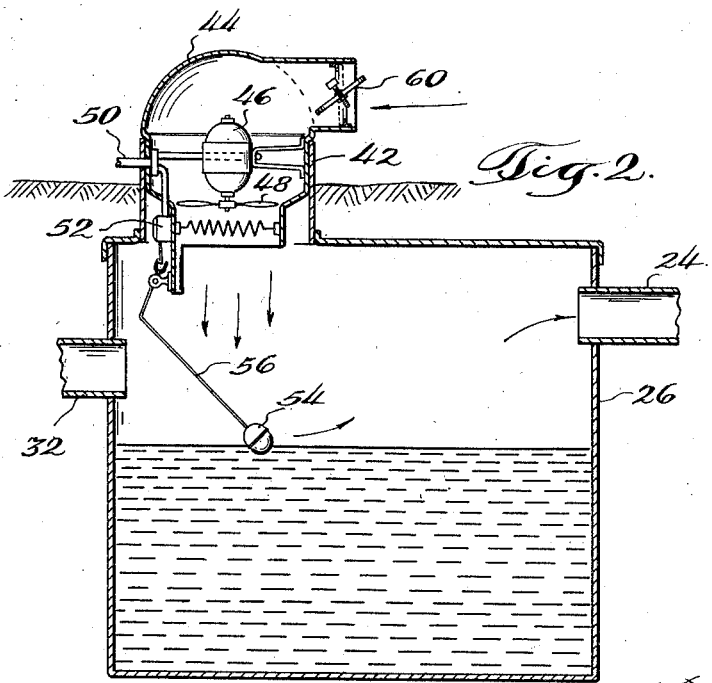

Patented Dec. 16, 1947

2,432,887

UNITED STATES PATENT OFFICE 2,432,887

SEWAGE DISPOSAL APPARATUS COMPRISING A SEPTIC TANK AND AN EVAPORATING TANK HAVING A VENT

Lyman J. Haviland, Mundelein, Ill.

Application September 14, 1944, Serial No. 553,974

5 Claims. (Cl. 210—6)

My invention relates generally to sewage disposal systems, and more particularly to improvements in small installations for individual homes and farms employing septic tanks and subsurface irrigation or drainage fields for the effluent.

In the usual septic tank system the raw sewage flows into the septic tank where, in the absence of air, it is digested due to the action of anaerobic bacteria. The sludge settles in the septic tank, from which it is removed from time to time. The liquid effluent is drawn from beneath the surface, flowing, either directly or via a dosing tank, into a drainage bed through a branched system of loosely joined hollow tile laid below the surface of the ground. The liquid effluent trickles from the hollow tile system into the top soil where it is aerated, drawn into the roots of vegetation, and ultimately evaporates harmlessly from the foliage.

The capacity of a system of this kind is dependent partly upon the size of the septic tank and to a greater extent upon the size and efficiency of the drainage bed. Overloading the drainage bed and excessive rainfall frequently cause the effluent to rise to the surface of the ground without being aerated, with the result that objectionable odors are produced. Unsatisfactory conditions also appear when, after long periods of use, the tile and the joints between them become clogged, with the result that the flow of the effluent is substantially stopped and sewage does not readily flow into the septic tank.

The primary object of my invention is to provide an improved system in which all or a major portion of the effluent is normally evaporated before it may reach the drainage bed, with the result that the drainage bed is free to handle occasional overloads.

A further object is to provide means for the rapid removal of vapors and gases from the effluent of a septic tank and to discharge them at a sufficient height above the ground that they will not be objectionable.

A further object is to provide an improved septic tank sewage treatment system in which the usual soil and vent pipe extending through the roof of the dwelling is utilized as a means for conveying vaporized effluent to the atmosphere.

Other objects will appear from the following description, reference being had to the accompanying drawings, in which:

Fig. 1 is a vertical sectional view, partly diagrammatic, of a complete sewage disposal system embodying the invention; and Fig. 2 is a vertical sectional view of a modified form of evaporation tank.

The improved sewage treating system is shown in Fig. 1 associated with a conventionally illustrated dwelling 10 having a flush type toilet 12, representative of all of the sanitary fixtures in the dwelling, connected to a soil and vent pipe 14. The soil pipe 14 extends vertically through the roof of the dwelling in the usual manner, except that it preferably extends as high or higher than the ridge of the roof and has a wind propelled exhaust turbine 16 at its upper end to create a partial vacuum in the soil and vent pipe 14. The soil and vent pipe 14 terminates in a T 18 within a buried septic tank 20, one branch of the T extending downwardly beneath the surface of the sewage digesting in the septic tank.

The liquid effluent flows from the septic tank through a second T 19 which likewise has one branch extending below the surface of the sewage in the tank 20. The upwardly extending branches of the T's 18 and 19 are joined by a by-pass pipe 22, while the third branch of the T 19 has a pipe 24 connected thereto for conducting the effluent from the septic tank 20 to an evaporating tank 26.

The effluent may flow from the evaporating tank 26 to a drainage bed or field 30 of the usual construction through a branched distributing network comprising open joint hollow porous tile sections 32. The connection of the tile network to the evaporating tank 26 is preferably at a level somewhat below that of the pipe 24, so that air may at all times flow freely through the latter pipe.

The tank 26 is provided with an air inlet duct 34 extending above the ground level and having a cap 36 secured over the upper end thereof to exclude rain and large foreign bodies.

It will be noted that the septic tank system of Fig. 1 differs from the conventional systems mainly in the addition of the evaporating tank 26, the air by-pass pipe 22, and the wind driven exhaust turbine 16, and in the elimination of the liquid seal trap, usually placed between the soil pipe 14 and the septic tank 20.

In the operation of this improved sewage treatment system the exhaust turbine 16 draws air from the atmosphere through the duct 34. The air flows across the surface of the effluent in the evaporating tank and causes rapid evaporation therefrom. The resulting water vapor, together with any malodorous vapors and gases emanating from the effluent, are conveyed through pipe 14, by-pass 22, and through the soil and vent pipe 14, to the atmosphere at a sufficient height above the ground that they will become highly diffused and unobjectionable even if the wind should blow them down to the ground level.

Since it is desirable to secure rapid evaporation of the effluent in the tank 26, the latter preferably is made as large in horizontal cross section as is economically practical, and, to increase the surface area of the effluent from which evaporation may take place, porous capillary wall linings or partitions, or both, extending into the effluent, may be utilized.

Depending upon prevalent climatic conditions, the means for assuring adequate flow of air through the system may be varied in particular installations. In some installations, as for example those in which the dwelling is heated during the greater part of the year, natural convection may be relied upon to assist the wind driven exhaust turbine in maintaining an adequate flow of air. In other installations, it may be found desirable to substitute an electric motor driven exhaust turbine for the wind driven turbine 16.

In still other installations in which the evaporation of the effluent in the tank 26 might not be sufficiently rapid if the apparatus of Fig. 1 were employed, the evaporating tank shown in Fig. 2 may be used. In this modified form of the invention the evaporating tank 26 is provided with an air inlet duct 42 into which is fitted a sheet metal elbow structure 44. Within the elbow 44 there is mounted a motor 46 driving an impeller fan 48. Energizing current for the motor is supplied from a suitable source by conductors within an electrical conduit 50, under the control of a switch 52. The switch 52 is operated by a float 54 carried by a pivoted lever 56, the latter being bifurcated so as to provide lost motion in the actuation of the switch. When the effluent in tank 26 rises above a predetermined high level, approximately the level at which the effluent would commence flowing from the tank through the tile sections 32, the float operates to close the switch 52, and when the effluent level drops to a substantially lower level the float operates to open this switch.

A freely turning butterfly type gravity operated check valve 60 is provided at the inlet opening of the elbow structure 44 to prevent escape of malodorous gases should there be a tendency toward reverse flow of air due to the effect of a gust of wind or the like. The valve 60 is preferably of the type commonly used for the control of draft in domestic heating systems, and operates upon very small pressure differences.

In some installations it may be desirable to increase the rate of evaporation by heating the air supplied by the fan 48, and a heating means for this purpose is diagrammatically illustrated in Fig. 2 as an electrical resistance which is connected in parallel with the motor 46 so as to be effective whenever the fan is in operation.

When operating under normal load, all, or a substantial part, of the effluent will be evaporated in the tank 26 and the water vapor, together with any malodorous vapors and gases which may be given off by the effluent, will be discharged to the atmosphere through the vent pipe 14. It is only when the system is temporarily supplied with an excessive amount of sewage that the subsurface irrigating system or drainage bed comes into full operation. Since the latter is not used to full capacity continuously it will be in excellent relatively dry condition ready to receive and quickly distribute the effluent throughout the drainage field.

The tank 26 also functions as a settling chamber in which any solid matter carried in suspension by the effluent flowing from the septic tank may have an opportunity to flocculate and settle to the bottom of the tank. Thus the amount of solid matter carried to the drainage bed is reduced to the minimum with the result that the tile network will remain unclogged for greatly extended periods of time. This is of considerable advantage since in the conventional septic tank systems the drainage bed frequently becomes clogged after being in use for a year or two and must be dug up and relaid.

It will have become apparent that one of the advantages of the improved system resides in the fact that the evaporating tank 26 is directly connected to the soil and vent pipe 14 so that air, water, vapor, and gases may, without interruption, be drawn or forced outwardly from the upper end of the vent pipe. Evaporation of the effluent will therefore be continuous. It will further be noted that while the usual liquid seal trap between the lower end of the soil pipe 14 and the septic tank is not shown, such trap could be retained provided merely that a suitable air duct connection be included to enable free flow of air from the evaporating tank 26 to the soil pipe 14 beyond such trap. The lower portion of the soil and vent pipe 14 has sufficient slope that sewage will not collect in it, and it will thus provide an adequate passageway for the free flow of the air, vapors, and gases.

The tanks 20 and 26 may be combined in a unitary structure preferably provided with facilities for pumping or otherwise removing the settled sludge from the septic tank 20, and for removing any solid matter which may have settled in the evaporating tank.

Due to the fact that the effluent will, under normal operating conditions, remain in the evaporating tank 26 for a substantial length of time, substantially all of the offensive gases will escape therefrom and a large proportion of the solids will settle. Thus, in the event of an overload of sewage, the effluent flowing to the drainage bed will be more nearly pure water than it would be if the evaporating tank were not provided.

In some installations it may be found to be of value, in increasing the evaporation rate, to utilize the heat generated in the septic tank to raise the temperature of the effluent in the evaporating tank, as by having a metal sheet form a common wall between the two tanks. However, in most installations the percentage of digestible solid matter in the sewage is so small that the heat generated by its digestion would not be sufficient to raise the temperature of the effluent appreciably, and such provision for heat exchange between the two tanks would not be warranted.

It is believed by some that the digestion of the sewage in a septic tank is more complete if no air is admitted to the tank. Others are of the opinion that the septic tank may be open to the atmosphere without interfering with the digestion of the sewage by the anaerobic bacteria. In deference to the first mentioned view, the by-pass pipe 22 is provided. This by-pass pipe has the additional purpose of preventing the drying and caking of the scum which usually collects on the surface of the sewage in the septic tank. It is however desirable to permit the escape from the tank of the gases, such as carbon dioxide, methane, nitrogen, and hydrogen, which are formed as a result of the bacterial action. For this purpose the by-pass pipe 22 preferably has a small hole, as indicated at 21, to permit the escape of such gases to the soil and vent pipe 14.

While particular embodiments of the invention are disclosed herein, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In a treating system for the sewage from a building having a vertical soil and vent pipe, a septic tank connected directly to said pipe, with the pipe outlet extending beneath the normal surface level of the sewage in the septic tank thereby to provide a liquid seal trap for the outlet, an effluent evaporating tank in constant free communication with the atmosphere, a connection leading from said septic tank below the normal surface level of the sewage therein to said evaporating tank thereby maintaining the normal level of the sewage in the septic tank, a conduit connecting the upper end of the evaporating tank with the soil and vent pipe, and means for causing flow of air into said evaporating tank and flow therefrom to the atmosphere through said conduit means and said soil and vent pipe.

2. In a treating system for the sewage from a building having a vertical soil and vent pipe, a septic tank connected to said pipe for the reception of sewage discharged into said pipe, said pipe having its discharge opening below the normal level of sewage in the septic tank, an effluent evaporating tank having an opening to the atmosphere, liquid seal trap means connecting the evaporating tank with said septic tank to permit flow from the latter whenever the normal level is exceeded, thereby to maintain the level of the sewage in the septic tank at a predetermined height, an air flow conduit connecting said evaporating tank to said soil and vent pipe, said conduit bypassing the sewage in the septic tank, and means for causing flow of air into said evaporating tank and flow directly therefrom to the atmosphere through said conduit and said soil and vent pipe.

3. In a treating system for the sewage from a building having a vertical soil and vent pipe, a septic tank connected to said pipe for the reception of sewage discharged into said pipe, said septic tank being sealed from substantial contact with air flowing through said soil and vent pipe, an effluent evaporating tank having an opening to the atmosphere and receiving effluent from said septic tank, an air flow conduit connecting said evaporating tank to said soil and vent pipe, and a motor driven fan to cause flow of air into said evaporating tank and therefrom to the atmosphere through said soil and vent pipe.

4. In a treating system for the sewage from a building having a vertical soil and vent pipe, a septic tank connected to said pipe for the reception of sewage discharged into said pipe, the discharge end of said pipe being below the normal level of sewage in the septic tank, an effluent evaporating tank having an opening to the atmosphere, means to connect the evaporating tank to the septic tank to permit flow of effluent from the latter to the former, said means being sealed against the flow of air by the liquid in the septic tank, means providing a conduit for the flow of air from said evaporating tank to said soil and vent pipe, means furnishing a passageway admitting air to said evaporating tank, means for causing flow of air into said conduit means and said evaporating tank and flow therefrom to the atmosphere through said soil and vent pipe, and means to heat the air flowing into said evaporating tank.

5. In a septic tank type of sewage treating system, the combination of a septic tank, a sewage collecting vent pipe having its upper end at a substantial elevation above the ground and open to the atmosphere and having its lower end connected to said septic tank at a point beneath the normal level of the sewage therein, an evaporating tank connected to said septic tank at a point below the normal level of the sewage in the latter to receive the effluent therefrom, the flow of the effluent from the septic tank to the evaporating tank maintaining a predetermined level of sewage in the septic tank, means connected to said evaporating tank to conduct effluent to a drainage bed, an air duct connecting the upper end of said evaporating tank to said vent pipe, and means for causing flow of air into said evaporating tank and therefrom through said duct and vent pipe to the atmosphere.

LYMAN J. HAVILAND.

REFERENCES CITED

The following references are of record in the file of this patent:

UNITED STATES PATENTS

| Number | Name | Date |
|---|---|---|
| 840,179 | Vogelsang | Jan. 1, 1907 |
| 1,708,864 | Birnbach | Apr. 9, 1929 |
| 209,552 | Demond et al. | Nov. 5, 1878 |
| 1,965,171 | Boyer | July 3, 1934 |
| 2,188,741 | Roberts | Jan. 30, 1940 |
| 691,365 | Dittler | Jan. 21, 1902 |
| 1,122,155 | Pratt | Dec. 22, 1914 |
| 1,223,427 | Scarborough | Apr. 24, 1917 |
| 2,211,565 | Hawley | Aug. 13, 1940 |
| 1,102,674 | Lawrence | July 7, 1914 |
| 1,950,841 | Crawford | Mar. 13, 1934 |
| 283,148 | Rowan | Aug. 14, 1883 |

FOREIGN PATENTS

| Number | Country | Date |
|---|---|---|
| 215,237 | Great Britain | May 8, 1924 |
| 1,502 | Great Britain | 1883 |
| 450,422 | Great Britain | July 17, 1936 |